United States Patent
Nowell et al.

(10) Patent No.: US 10,941,866 B2
(45) Date of Patent: Mar. 9, 2021

(54) STEM GUIDED VALVE

(71) Applicant: Kerr Machine Co., Sulphur, OK (US)

(72) Inventors: Mark S. Nowell, Ardmore, OK (US); Michael Cole Thomas, Ardmore, OK (US); Christopher Todd Barnett, Stratford, OK (US); Michael Eugene May, Ardmore, OK (US); Kelcy Jake Foster, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 144 days.

(21) Appl. No.: 16/374,916

(22) Filed: Apr. 4, 2019

(65) Prior Publication Data

US 2019/0309858 A1    Oct. 10, 2019

Related U.S. Application Data

(60) Provisional application No. 62/653,605, filed on Apr. 6, 2018.

(51) Int. Cl.

| *F16K 1/38* | (2006.01) |
| *F16K 21/04* | (2006.01) |
| *F16K 15/06* | (2006.01) |
| *F04B 53/16* | (2006.01) |
| *F04B 53/10* | (2006.01) |

(52) U.S. Cl.
CPC ................ *F16K 1/38* (2013.01); *F16K 21/04* (2013.01); *F04B 53/10* (2013.01); *F04B 53/16* (2013.01); *F16K 15/063* (2013.01)

(58) Field of Classification Search
CPC .......... F16K 1/38; F16K 21/04; F16K 15/063; F16K 27/0209; F04B 53/16; F04B 53/10; F04B 1/0538; F04B 1/0461; F04B 1/0452
See application file for complete search history.

(56) References Cited

U.S. PATENT DOCUMENTS

| 5,207,242 | A | * | 5/1993 | Daghe ..................... E03C 1/106 |
| | | | | 137/454.6 |
| 8,317,498 | B2 | | 11/2012 | Gambier et al. |
| 9,022,345 | B2 | * | 5/2015 | Bisig ....................... B23P 11/00 |
| | | | | 251/29 |
| 9,032,992 | B2 | * | 5/2015 | Andersson ............. F16K 25/005 |
| | | | | 137/516.29 |
| 9,284,953 | B2 | * | 3/2016 | Blume .................... F04B 53/10 |
| 9,416,887 | B2 | | 8/2016 | Blume |
| 9,631,739 | B2 | | 4/2017 | Belshan et al. |
| 2017/0002947 | A1 | | 1/2017 | Bayyouk et al. |
| 2019/0011051 | A1 | | 1/2019 | Yeung |

* cited by examiner

*Primary Examiner* — Eric Keasel
(74) *Attorney, Agent, or Firm* — Tomlinson McKinstry, P.C.

(57) ABSTRACT

A stem-guided valve for use inside of a fluid end. The valve body is installed in a conduit that traverses the fluid end housing. A removable guide element is installed within a bore formed in the valve body. A static component that is interposed within the conduit includes an elongate projecting stem. As the stem reciprocates axially with the guide element, the valve is caused to move between open and closed positions. In its closed position, the valve body engages a valve seat that surrounds the conduit. A plurality of perforations are formed in the walls of the guide element, the perforations allow fluid to drain from the guide element during operation.

20 Claims, 12 Drawing Sheets

STEM GUIDED VALVE

SUMMARY

The present invention is directed to a fluid end comprising a housing having a conduit extending therethrough, a valve body, a removable guide element, and static component. The valve body is situated within the conduit and has a blind bore formed therein. The removable guide element has coaxial first and second end sections. The first end section is received within the bore such that the second end section is entirely outside of the bore. The second end section defines a hollow and open-ended structure having one or more side walls having a plurality of perforations formed therein. The static component is installed within the conduit and carries an elongate projecting stem. The second section of the guide element is positioned for axial reciprocation around the stem.

DETAILED DESCRIPTION

Figure 1:
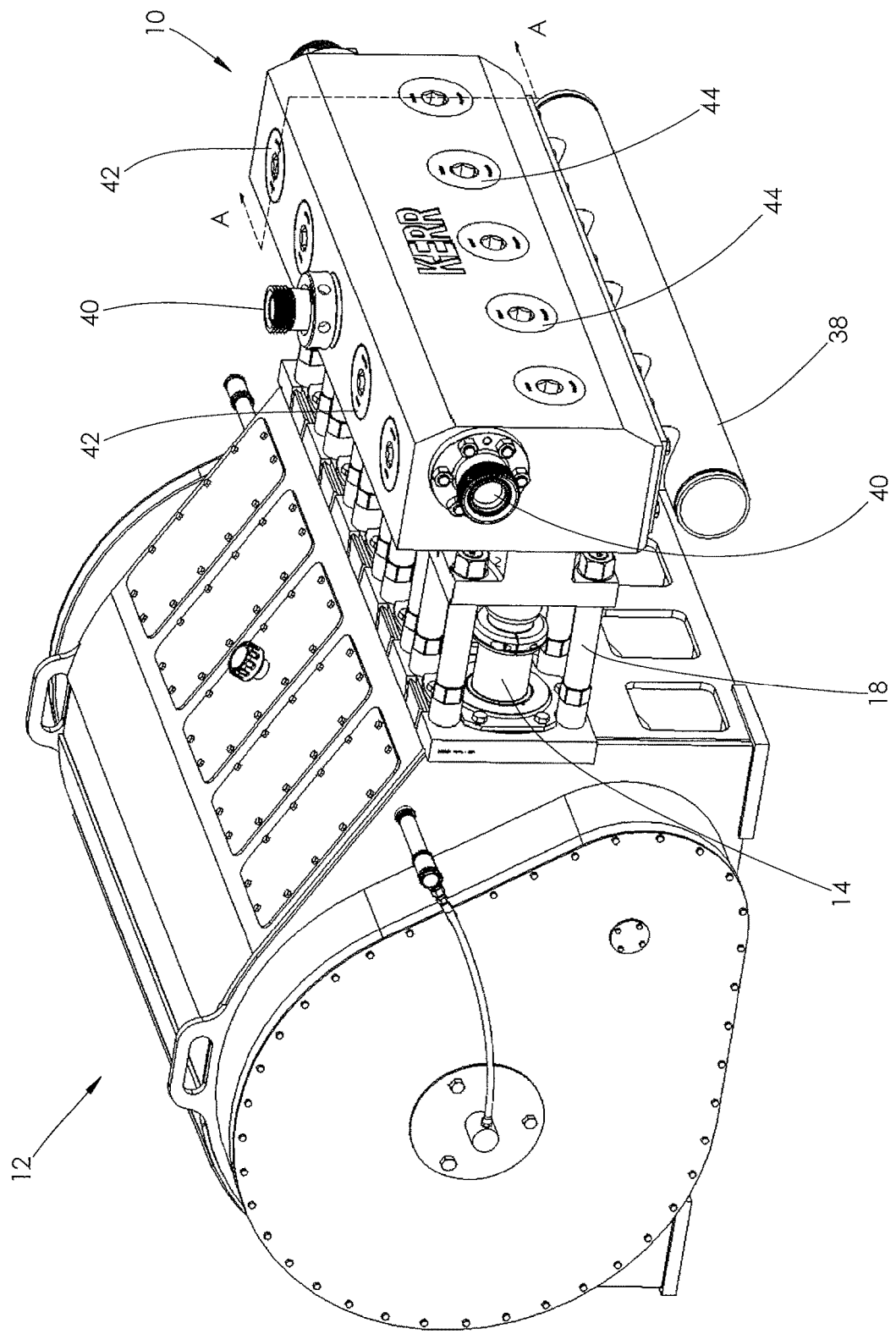
FIG. 1 is a perspective view of a prior art fluid end attached to a power end.
Figure 2:
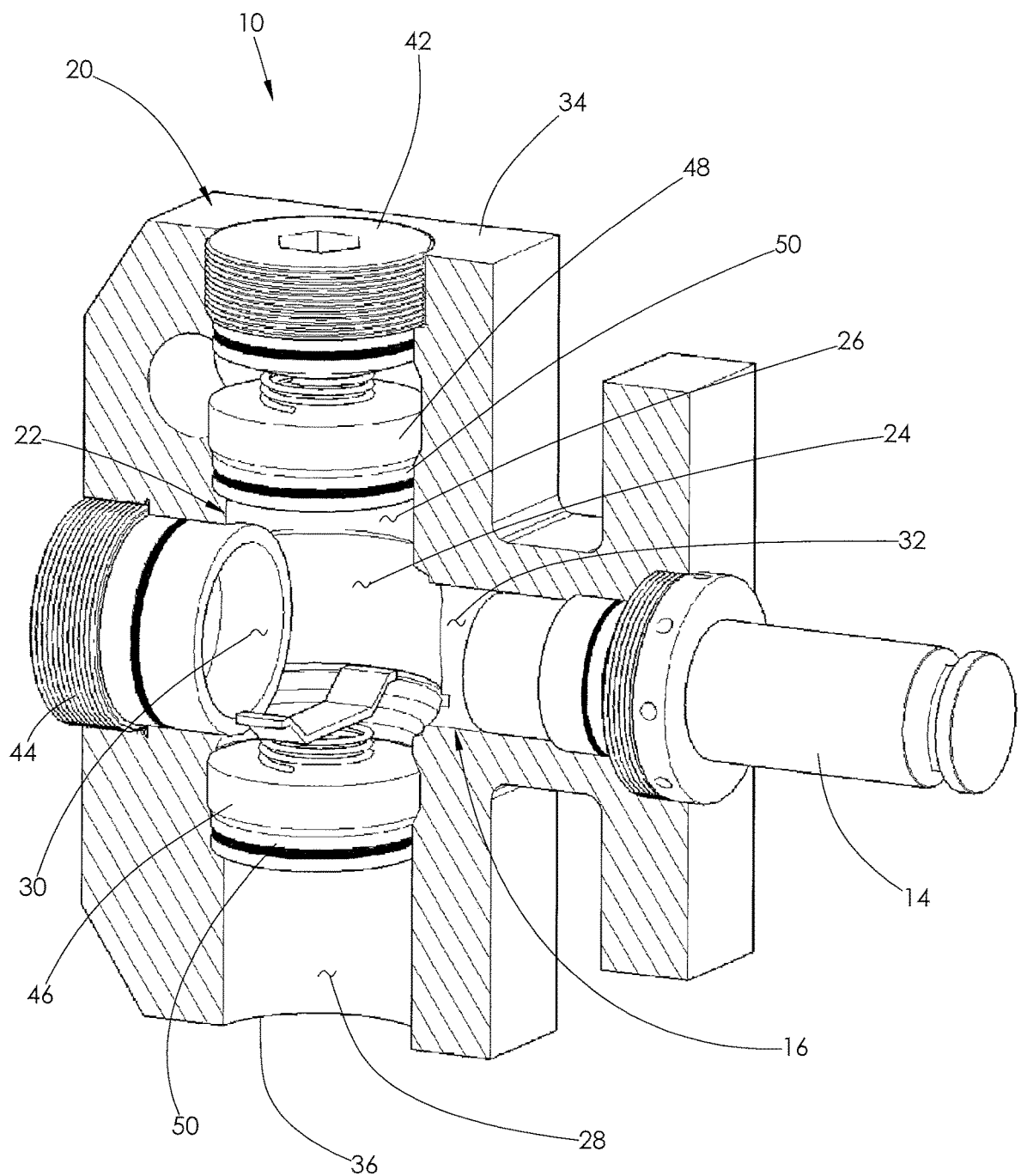
FIG. 2 is a perspective view of a fluid end. The housing has been partially cut away to better display installed components.

Turning to the figures, FIG. 1 shows a prior art fluid end 10 attached to a power end 12. The fluid end 10 is used in oil and gas operations to deliver highly pressurized corrosive and/or abrasive fluids to piping leading to a wellbore. Fluid is pumped throughout the fluid end 10 by a plurality of plungers 14. Each of the plungers 14 is disposed within a corresponding conduit 16 formed in the fluid end 10, as shown in FIG. 2. An engine attached to the power end 12 causes the plungers 14 to reciprocate within the conduits 16. The power end 12 is attached to the fluid end 10 via a plurality of stay rods 18.

Fluid may be pumped through the fluid end 10 at pressures that range from 5,000-15,000 pounds per square inch (psi). Fluid used in high pressure hydraulic fracturing operations is typically pumped through the fluid end 10 at a minimum of 8,000 psi. However, fluid will normally be pumped through the fluid end 10 at pressures around 10,000-15,000 psi during such operations.

Continuing with FIG. 2, the fluid end 10 comprises a fluid end housing 20 having a first conduit 22 and a second conduit 16 formed therein. The conduits 22 and 16 intersect each other to form an internal chamber 24. The first conduit 22 has aligned first and second sections 26 and 28, and the second conduit 16 has aligned third and fourth sections 30 and 32. Each section 26, 28, 30, and 32 independently connects the internal chamber 24 and an external surface 34 of the housing 20. The sections 26, 28, 30, and 32 are aligned such that the conduits 22 and 16 may be orthogonal to one another.

With reference to FIGS. 1 and 2, the housing 20 has a plurality of first and second conduits 22 and 16 positioned adjacent one another. Each first conduit 22 has an intake opening 36 formed in its second section 28. The intake openings 36 are each connected to a manifold 38. The manifold 38 attaches to a piping system configured to deliver fluid to the fluid end 10. Each first section 26 of the first conduits 22 communicates with one or more discharge openings 40. High pressure fluid exits the fluid end 10 through the discharge openings 40.

Each second section 28 of each first conduit 22 may be sealed by a discharge plug 42. Likewise, each third section 30 of each second conduit 16 may be sealed by a suction plug 44. Each of the fourth sections 32 of the second conduit 16 may house one of the plurality of plungers 14.

With reference to FIG. 2, an intake valve 46 and a discharge valve 48 are positioned within the first conduit 22. The intake valve 46 is positioned in the second section 28 if the first conduit 22. The intake valve 46 prevents fluid from flowing back through the intake opening 36 after entering the internal chamber 24. A discharge valve 48 is positioned in the first section 26 of the first conduit 22. The discharge valve 48 prevents fluid from reentering the internal chamber 24 after flowing towards one or more of the discharge openings 40. Each adjacent first conduit 22 within the fluid end 10 contains an intake valve 46 and a discharge valve 48.

The valves 46 and 48 each seal against a valve seat 50 sized to fit within each section 26 and 28 of the first conduit 22. The valve seats 50 each have an internal passage in communication with the first conduit 22. Valves known in the art may have legs that engage the inner diameter of the internal passage formed in the seat. The legs help center the valve on the valve seat. However, because the legs are within the fluid path of the conduit, the legs are subject to erosion.

In alternative valves known in the art, the legs have been removed from the flow path and replaced with a stem positioned above the valve. The stem reciprocates within a matching guide bore. The stem may be attached to the valve, or a guide bore may be formed in the valve for receiving the stem. Stem guided valves still experience erosion between the stem and matching guide bore that can allow misalignment of the valve against the seat. Stem guided valves also have a possibility of reduced flow capacity if fluid and proppant fills the volume between the stem and its complementary guide bore. If such volume is reduced, the axial travel of the valve may be reduced, limiting the amount of fluid that may flow past the valve. The present invention is directed to various embodiments of improved stem guided valves for use with the fluid end 10.

Figure 3:
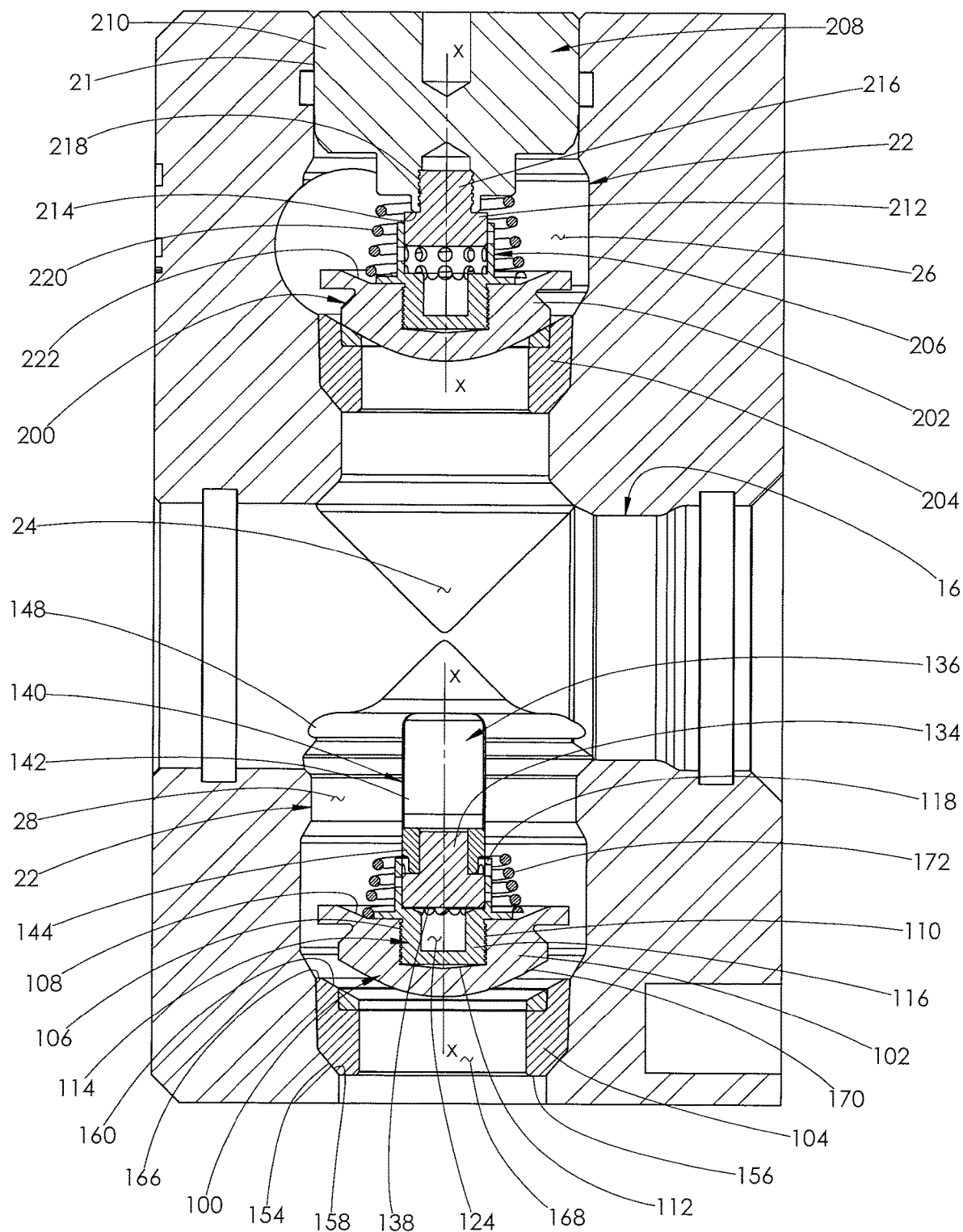
FIG. 3 is a cross-sectional view of a portion of the fluid end shown in FIG. 1, taken along line A-A. A first embodiment of a discharge valve is installed in an upper section of the vertical conduit. A first embodiment of an intake valve is installed in a lower section of the same conduit.
Figure 5:
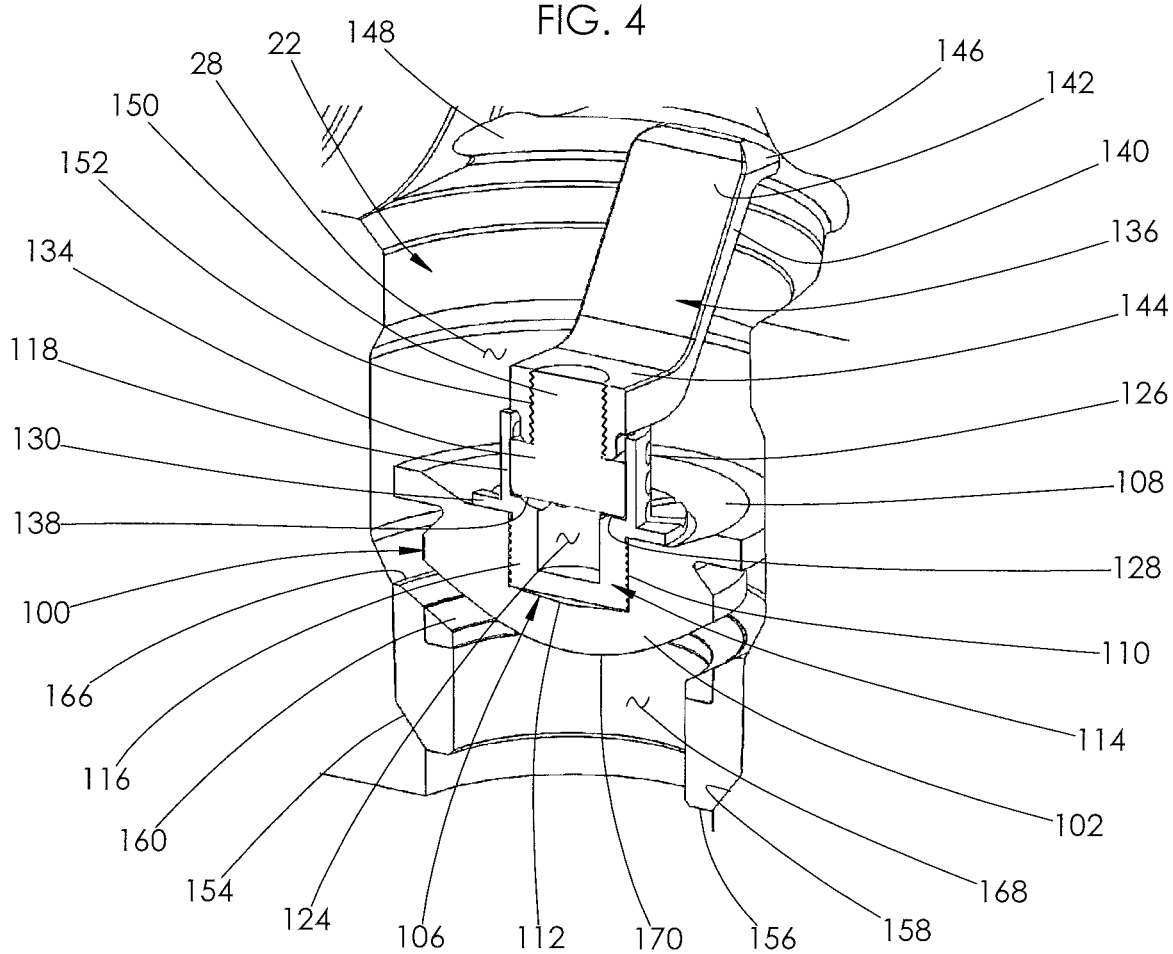
FIG. 5 is a perspective cross-sectional view of the intake valve shown in FIG. 3. A spring used with the valve has been removed for clarity.

Turning to FIGS. 3 and 5, a first embodiment of an intake valve 100 is positioned within the second section 28 of the first conduit 22. The intake valve 100 comprises a valve body 102 configured to move between an open position and a closed position. In the closed position, the valve body 102 seals against a valve seat 104. When sealed, fluid is blocked from flowing past the valve body 102. In the open position, the valve body 102 is spaced apart from the valve seat 104. When spaced apart, fluid may flow past the valve body 102 and into the internal chamber 24, as shown in FIGS. 3 and 5.

A blind bore 106 is formed in the valve body 102 that opens at its top surface 108. The bore 106 has non-tapered side walls 110 joined by a substantially flat base 112. The bore 106 is configured to receive a removable guide element 114. The guide element 114 has coaxial first and second end sections 116 and 118. The first end section 116 is sized to be closely received within the bore 106. External threads are formed on the outer surface of the first end section 116 that mate with internal threads formed in the side walls 110 of the bore 106. In alternative embodiments, the first end section may be press-fit into the bore 106. In further alternative embodiments, the guide element may be welded to the valve body, or the guide element and valve body may be a single piece. A blind bore 124 is formed in the first end section 116 that opens into the second end section 118.

The second end section 118 is hollow and open-ended. A plurality of perforations 126 are formed in one or more side walls of the second end section 118. The perforations 126 shown in FIGS. 3 and 5 are circular ports. The inner diameter of the first end section 116 is smaller than the inner diameter of the second end section 118. Due to the varying diameters, a ledge 128 is formed in the interior of the guide element 114 at the transition from the first end section 116 to the second end section 118. The ledge 128 is positioned adjacent a flange 130 formed around the outer periphery of the second end section 118.

Figure 6:
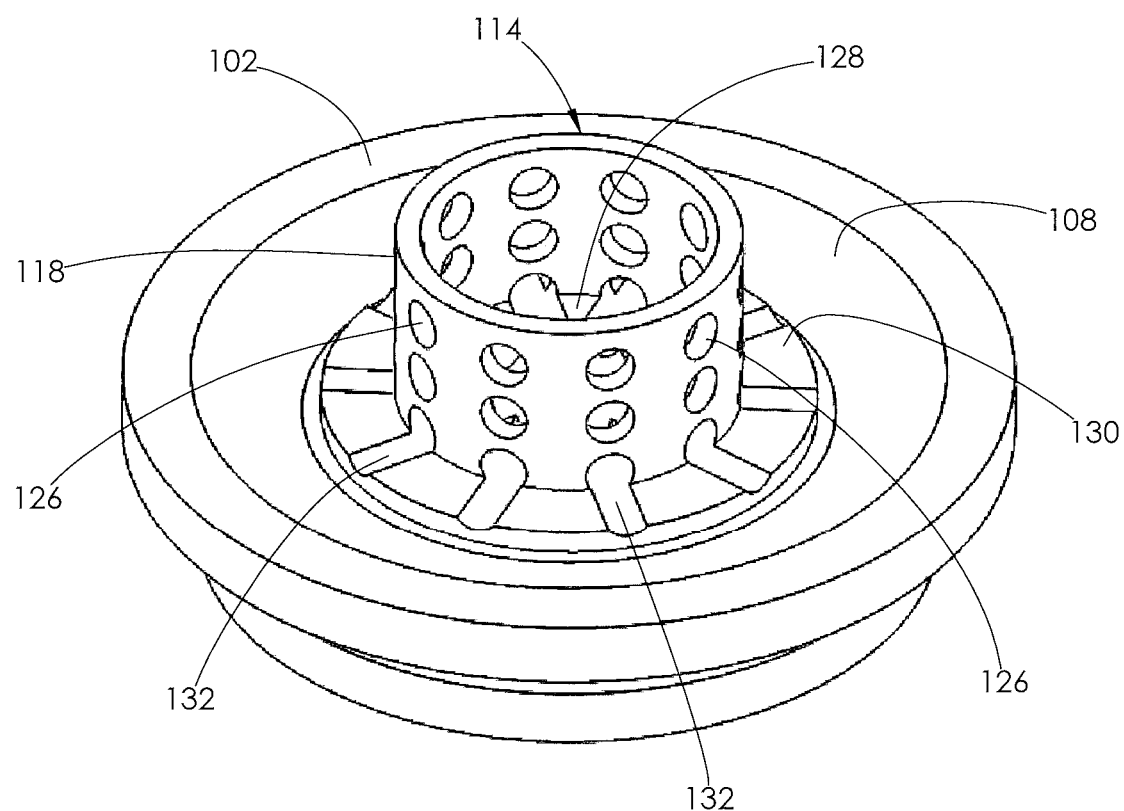
FIG. 6 is a perspective view of a removable guide element installed within the valve body of the intake valve shown in FIGS. 3 and 5.

The first end section 116 is installed within the bore 106 such that the flange 130 engages with the top surface 108 of the valve body 102. When installed, the second end section 118 is entirely outside of the bore 106, as shown in FIG. 6.

A plurality of grooves 132 are formed in the flange 130. Each groove 132 intersects a corresponding one of the perforations 126 and extends into the ledge 128, as shown in FIG. 6. In alternative embodiments, the guide element 114 may not have a flange 130.

Continuing with FIGS. 3 and 5, the valve body 102 remains centered over the valve seat 104 by engaging the guide element 114 with an elongate stem 134 attached to a static component 136. The stem 134 is sized to be closely received within the second end section 118 of the guide element 114. As the valve body 102 moves between open and closed positions, the stem 134 axially reciprocates within the second end section 118 along the X-X axis, as shown in FIG. 3. The stem 134 has a flat base 138 that engages with the ledge 128 as the valve body 102 moves between the open and closed positions. Engagement of the stem 134 with the ledge 128 blocks the valve body 102 from further axial movement when moving to the open position.

The static component 136 is rigidly installed within the second section 28 of the first conduit 22. The static component 136 used with the intake valve 100 is a retainer 140. The retainer 140 has side arms 142 that join a base 144, such that the retainer has a U-shape. A top edge 146 of each side arm 142 mounts within a groove 148 formed in the walls of the first conduit 22. The stem 134 projects from the base 144 of the retainer 140. The stem 134 has an externally threaded upper portion 150 that mates with an internally threaded bore 152 formed in the retainer 140. In alternative embodiments, the upper portion of the stem may be press-fit into the bore formed in the retainer. In further alternative embodiments, the upper portion of the stem may be welded to the retainer, or the stem and retainer may be a single piece.

Continuing with FIGS. 3 and 5, the valve seat 104 has a tapered outer surface 154 formed adjacent its bottom end 156. The tapered outer surface 154 engages with a tapered wall 158 formed in the walls of the second section 28. Such engagement holds the valve seat 104 within the first conduit 22. A tapered inner surface 160 is formed at a top end 166 of the valve seat 104. The tapered inner surface 160 joins a central opening 168 formed in the valve seat 104 that is in communication with the first conduit 22. A rounded bottom surface 170 of the valve body 102 is configured to seal against the tapered inner surface 160 of the valve seat 104.

A spring 172 is positioned between the top surface 108 of the valve body 102 and the base 144 of the retainer 140. The spring 172 biases the valve body 102 in the closed position. The position of the valve body 102 is determined by the difference in the fluid pressure above and below the valve body 102. The valve body 102 will move to the open position if the fluid pressure below the valve body 102 is greater than the fluid pressure above the valve body 102. The fluid pressure below the valve body 102 must also be great enough to overcome the additional force applied by the spring 172 in order to move the valve body 102 to the open position.

In operation, fluid may enter the first and second end sections 116 and 118 of the guide element 114. The bore 124 formed in the first section 116 provides space for fluid trapped in the guide element 114 to accumulate, as the valve body 102 moves to the open position. Fluid may drain from the guide element 114 through the perforations 126, as the valve body 102 moves to the closed position. Without, the perforations 126, excess fluid accumulated within the guide element 114 would restrict axial movement of the stem 134. Restricted movement of the stem 134 leads to restricted fluid flow throughout the fluid end 10.

Over time, the high pressure fluid may start to erode the interior walls of the guide element 114 and the outer walls of the stem 134. Such erosion may lead to misalignment of the valve body 102 with the valve seat 104. To help combat erosion, the guide element 114 and the stem 134 may be sprayed with a material known to reduce erosion, such as tungsten carbide. The valve body 102 and valve seat 104 may also be sprayed with a material known to reduce erosion, such as tungsten carbide. In alternative embodiments, the valve components may be formed from materials known to be less susceptible to erosion, such as tungsten carbide.

Because the guide element 114 is removable, the guide element 114 may also be replaced with a new guide element, if needed. Likewise, the stem 134 may be replaced with a new stem, if needed. A new stem may be installed within the static component 136 or a new static component carrying a new stem may be installed in the first conduit 22.

Figure 4:
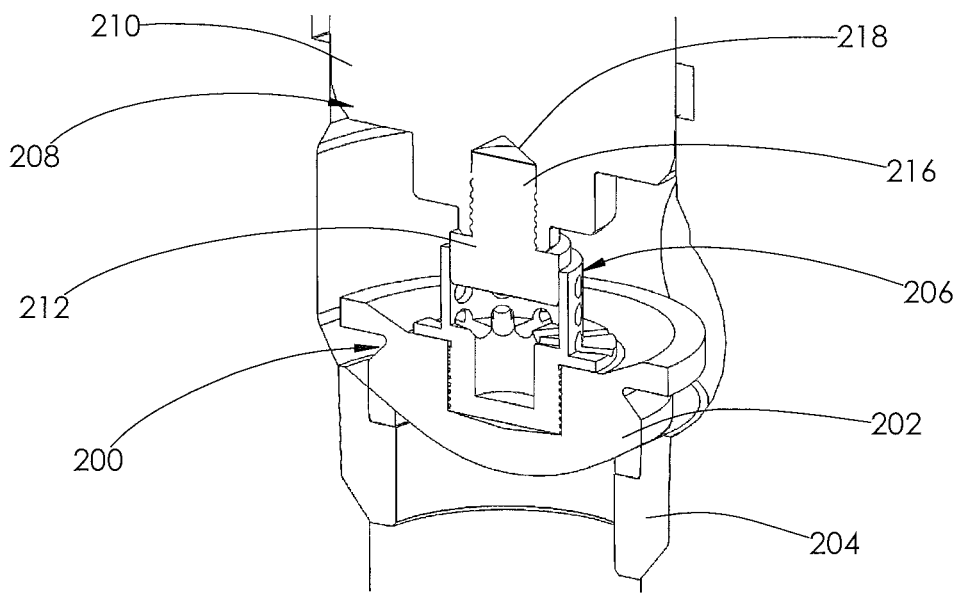
FIG. 4 is a perspective cross-sectional view of the discharge valve shown in FIG. 3. A spring used with the valve has been removed for clarity.

With reference to FIGS. 3 and 4, a first embodiment of a discharge valve 200 is positioned within a first section 26 of the first conduit 22. The discharge valve 200 comprises a valve body 202 that seals against a valve seat 204. A removable guide element 206 is installed within the valve body 202. The valve body 202, guide element 206, and valve seat 204 are identical to those described with reference to the intake valve 100.

A static component 208 used with the discharge valve 200 is a discharge plug 210. The plug 210 is sized to be closely received within an opening 21 of the first section 26 of the first conduit 22. An elongate stem 212 projects from a bottom surface 214 of the plug 210. The stem 212 has a threaded upper portion 216 that mates with a threaded blind bore 218 formed in the plug 210. Because the stem 212 is threaded to the plug 210, the stem 212 may be removed and replaced with a new stem, if needed. Like stem 134, the stem 212 may be sprayed with or formed from a material known to reduce erosion, such as tungsten carbide.

A spring 220 is positioned between a top surface 222 of the valve body 202 and the bottom surface 214 of the plug 210. The spring 220 biases the valve body 202 in a closed position, as shown in FIGS. 3 and 4. The valve body 202 moves between an open and closed position in the same manner as the valve body 102 of the intake valve 100.

Figure 7:
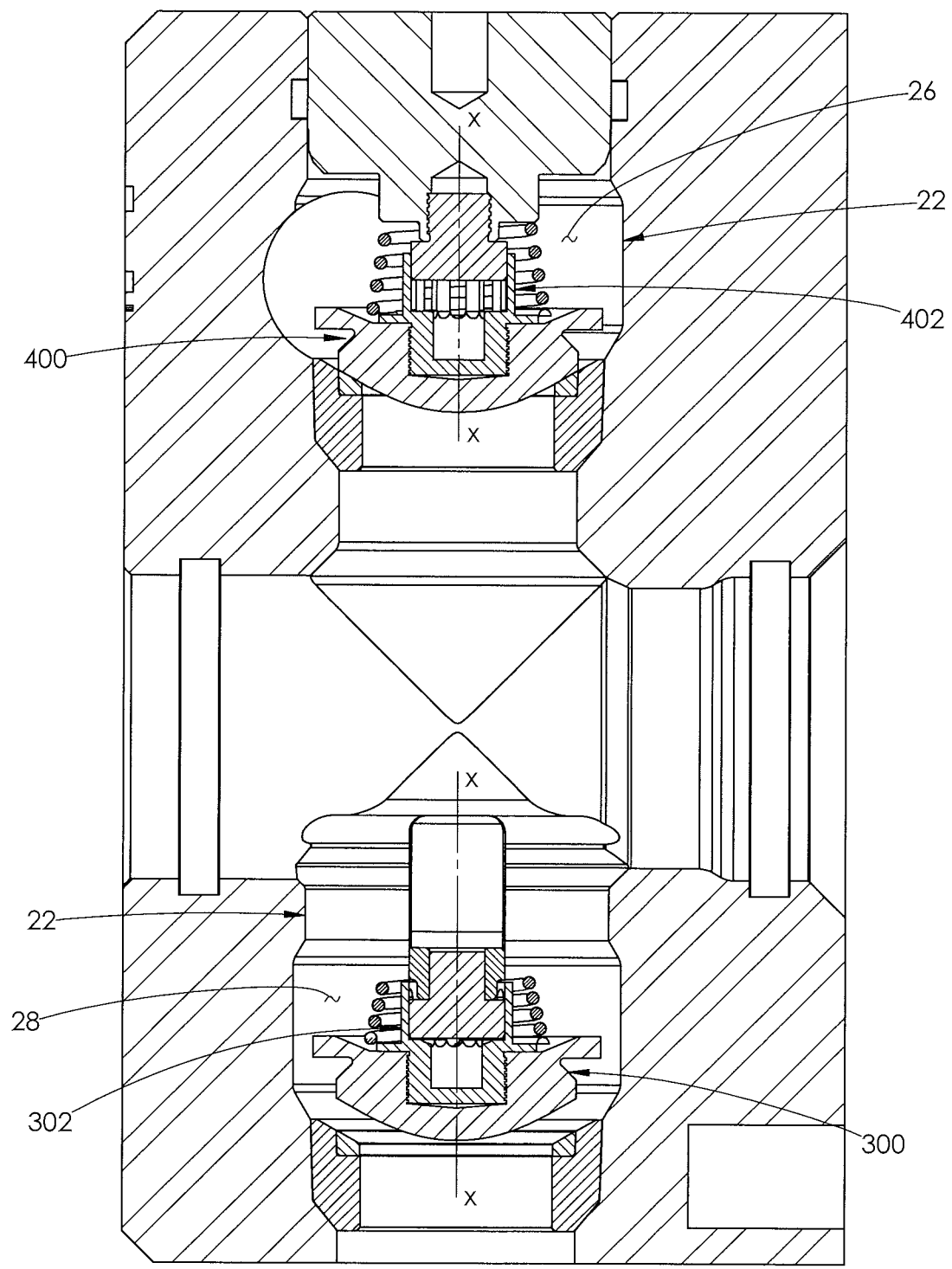
FIG. 7 is a cross-sectional view of a portion of the fluid end shown in FIG. 1, taken along line A-A. A second embodiment of a discharge valve is installed in an upper section of the vertical conduit. A second embodiment of an intake valve is installed in a lower section of the same conduit.
Figure 9:
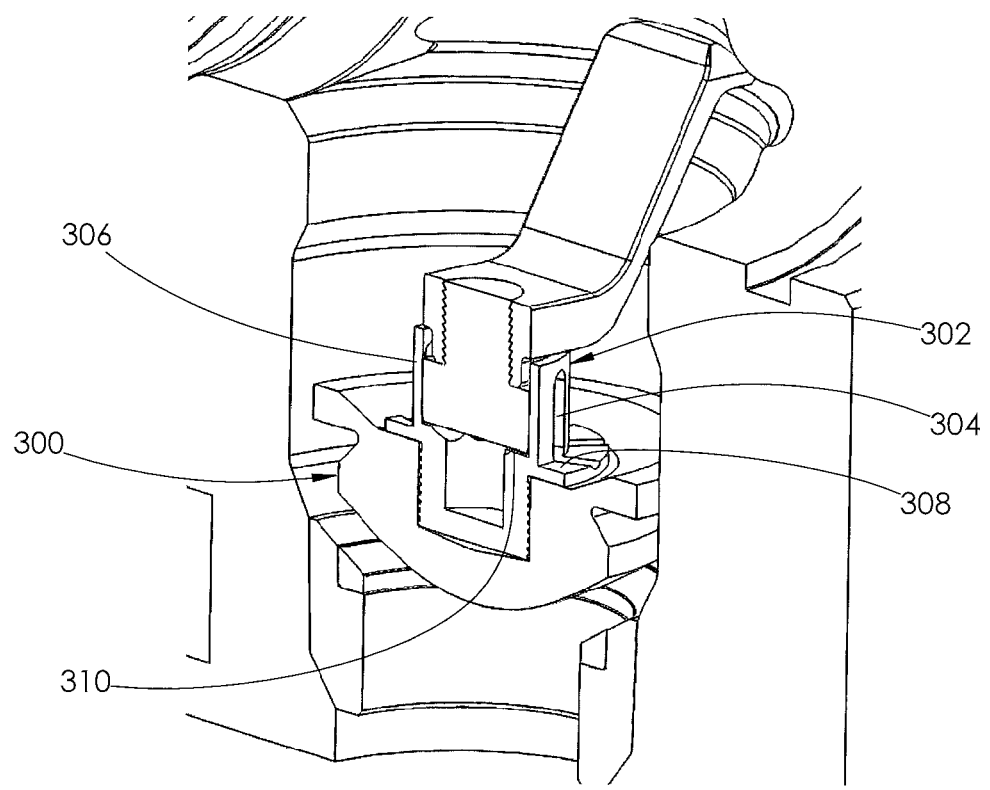
FIG. 9 is a perspective cross-sectional view of the intake valve shown in FIG. 7. A spring used with the valve has been removed for clarity.
Figure 10:
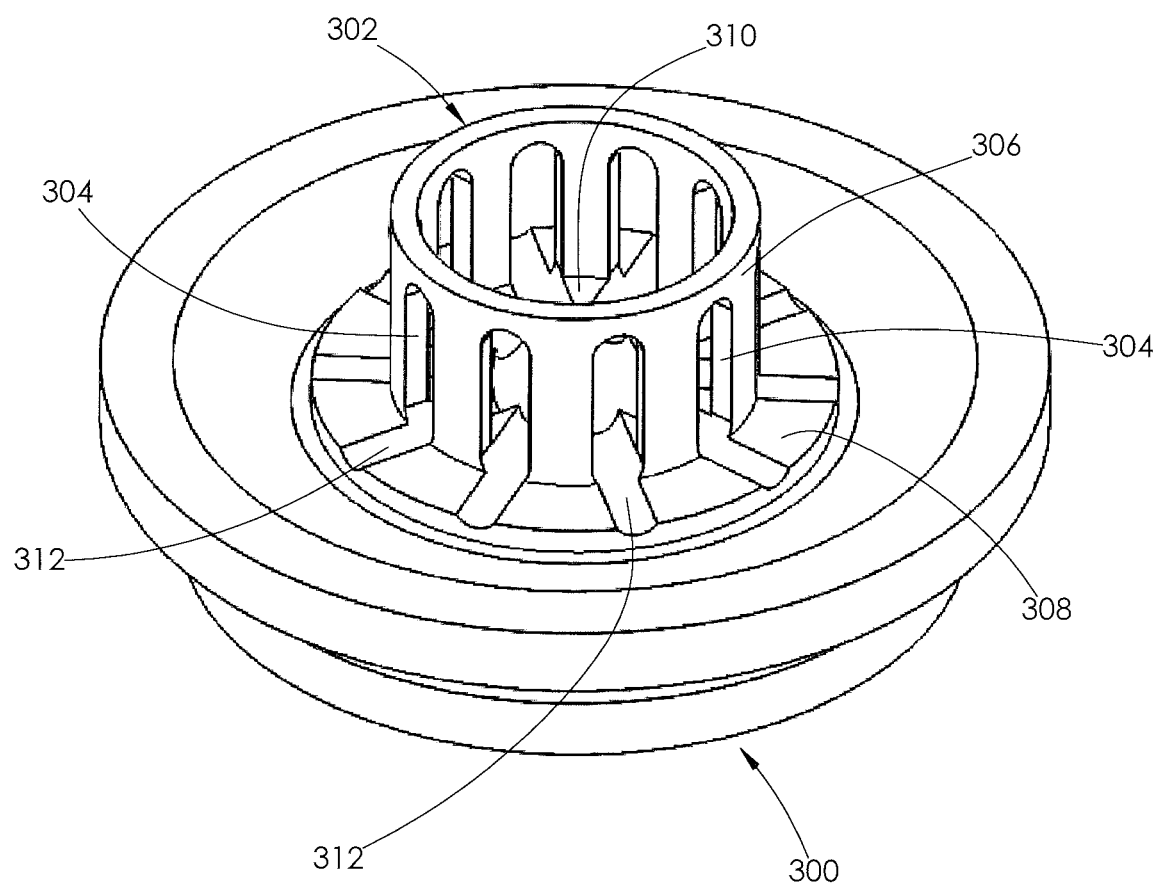
FIG. 10 is a perspective view of a removable guide element installed within the valve body of the intake valve shown in FIGS. 7 and 9.

Turning to FIGS. 7, 9 and 10, a second embodiment of an intake valve 300 is positioned within the second section 28 of the first conduit 22. The intake valve 300 is identical to the intake valve 100, shown in FIGS. 3 and 5, with the exception of a removable guide element 302. The guide element 302 is identical to the guide element 114, shown in FIG. 6, with the exception of the shape of its plurality of perforations 304, as shown in FIG. 10. The plurality of perforations 304 formed in the side walls of a second end section 306 of the guide element 302 are elongate axially-extending slots.

Like the guide element 114, the guide element 302 has a flange 308 formed around its outer periphery and a ledge 310 formed in its inner surface. A plurality of grooves 312 are formed in the flange 308. Each groove 312 intersects a corresponding one of the perforations 304 and extends into the ledge 310, as shown in FIG. 10. In alternative embodiments, the guide element 114 may not have a flange 308.

In alternative embodiments, the plurality of perforations formed in the guide element may have shapes other than circular ports or axially-extending slots. For example, the perforations may be slots that extend perpendicular to the X-X axis shown in FIG. 7.

Figure 8:
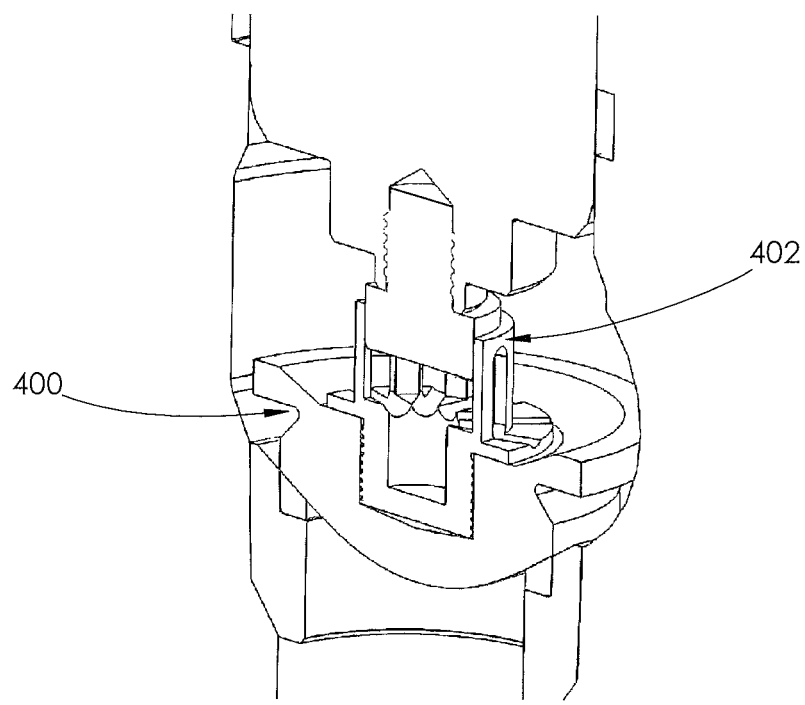
FIG. 8 is a perspective cross-sectional view of the discharge valve shown in FIG. 7. A spring used with the valve has been removed for clarity.

With reference to FIGS. 7 and 8, a second embodiment of a discharge valve 400 is positioned within the first section 26 of the first conduit 22. The discharge valve 400 is identical to the discharge valve 200, with the exception of a removable guide element 402. The guide element 402 is identical to the guide element 302 used with the intake valve 300.

Figure 11:
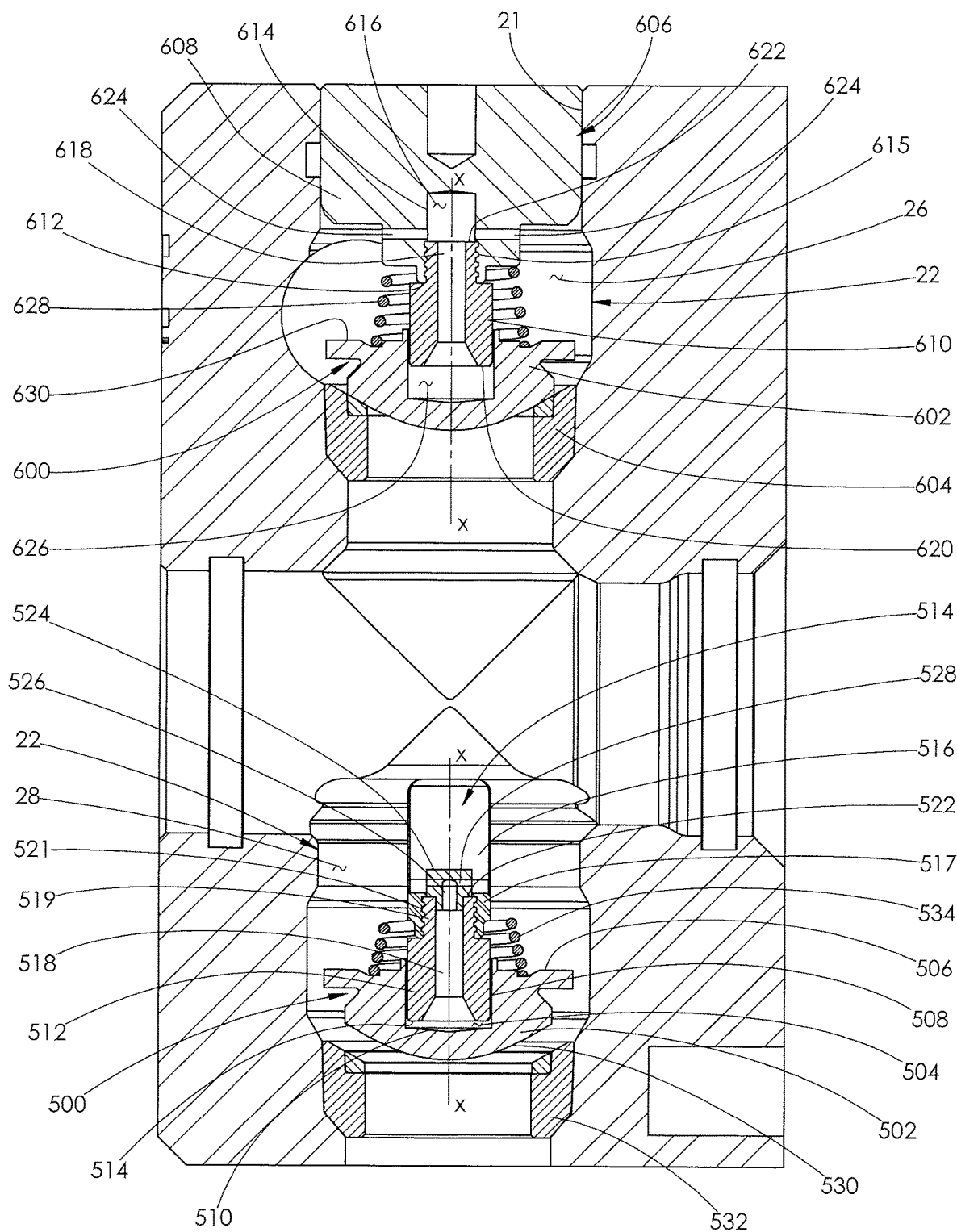
FIG. 11 is a cross-sectional view of a portion of the fluid end shown in FIG. 1, taken along line A-A. A third embodiment of a discharge valve is installed in an upper section of the vertical conduit. A third embodiment of an intake valve is installed in a lower section of the same conduit.
Figure 13:
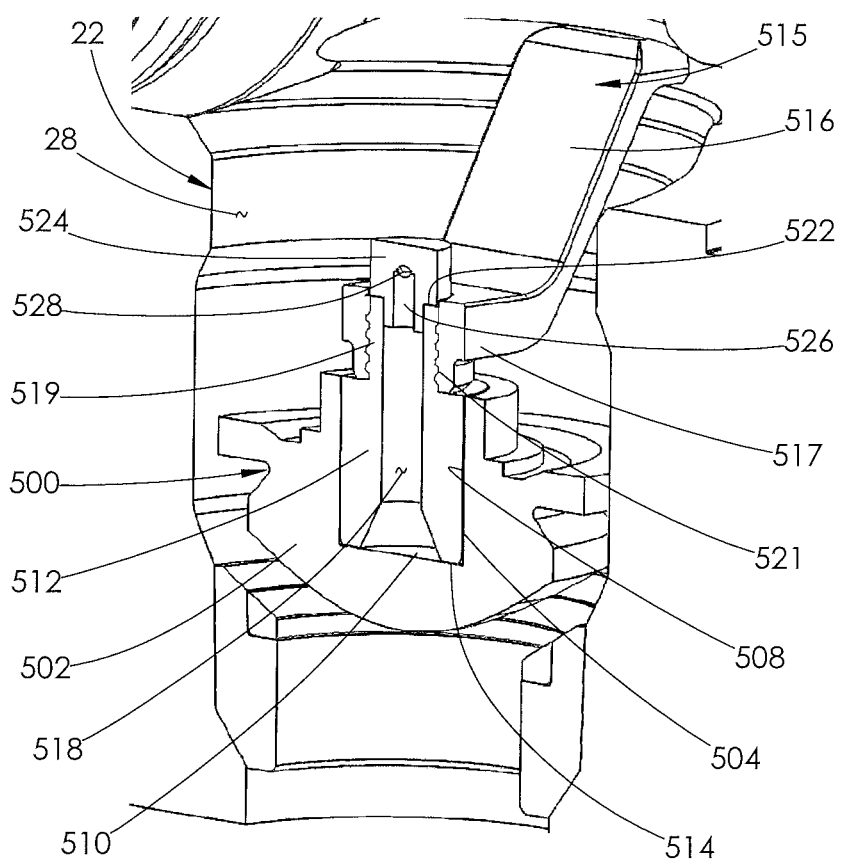
FIG. 13 is a perspective cross-sectional view of the intake valve shown in FIG. 11. A spring used with the valve has been removed for clarity.

Turning to FIGS. 11 and 13, a third embodiment of an intake valve 500 is positioned within a second section 28 of the first conduit 22. The intake valve 500 comprises a valve body 502 configured to move between an open position and a closed position. A blind bore 504 is formed in a top surface 506 of the valve body 502. The bore 504 has non-tapered side walls 508 joined by a flat base 510. The side walls 508 project from the top surface 506 of the valve body 502.

The bore 504 is configured to closely receive an elongate stem 512. As the valve body 502 moves between open and closed positions, the stem 512 axially reciprocates within the bore 504 along the X-X axis, as shown in FIG. 11. A flat base 514 of the stem 512 engages with the base 510 of the bore 504 as the valve body 502 moves between open and closed positions. Engagement of the stem 512 with the base 510 blocks the valve body 502 from further axial movement when moving to the open position.

A static component 515 rigidly installed within the second section 28 of the first conduit 22 supports the stem 512. The static component 514 shown in FIG. 11 is a retainer 516. The retainer 516 is identical to the retainer 140 used with intake valve 100 shown in FIGS. 3 and 5. The stem 512 projects from a base 517 of the retainer 516. The stem 512 has a threaded upper portion 519 that mates with a threaded bore 521 formed in the retainer 516. Because the stem 512 is threaded to the retainer 516, the stem 512 may be removed and replaced with a new stem, if needed.

Continuing with FIGS. 11 and 13, an axial drainage channel 518 is formed in the stem 512 that opens on its base 514 and on its top end 522. The channel 518 communicates with the first conduit 22. A closure element 524 is sized to be closely received within an opening of the channel 518 at its top end 522. The closure element 524 may be press-fit or welded to the stem 512. In alternative embodiments, the closure element may thread onto the stem.

A blind bore 526 is formed in the closure element 524 that intersects a cross-bore 528 also formed in the closure element 524. The bore 504 formed in the valve body 502 communicates with the channel 518, bore 526 and cross-bore 528. The cross-bore 528 communicates with the first conduit 22. In operation, fluid that accumulates within the bore 504 may drain from the bore 504 through the channel 518, bore 526, and cross-bore 528. To help combat erosion, the stem 512 and the bore 504 may be sprayed with or formed from a material known to reduce erosion, such as tungsten carbide.

Continuing with FIGS. 11 and 13, a rounded bottom surface 530 of the valve body 502 seals against a valve seat 532. The valve seat 532 is identical to the valve seat 104 shown in FIGS. 3 and 5. A spring 534 is positioned between the top surface 506 of the valve body 502 and the base 517 of the retainer 516. The spring 534 biases the valve body 502 in a closed position. The valve body 502 moves between the open and closed positions in the same manner as the valve body 102 of the intake valve 100, which is described with reference to FIGS. 3 and 5.

Figure 12:
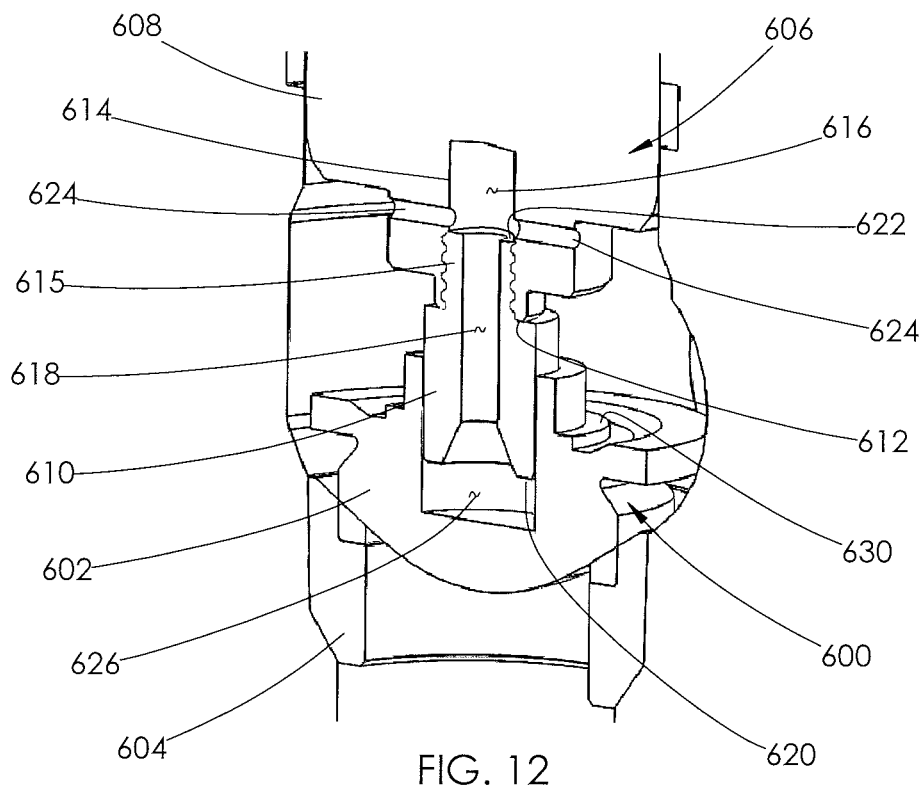
FIG. 12 is a perspective cross-sectional view of the discharge valve shown in FIG. 11. A spring used with the valve has been removed for clarity.

With reference to FIGS. 11 and 12, a third embodiment of a discharge valve 600 is positioned within the first section 26 of the first conduit 22. The discharge valve 600 comprises a valve body 602 that seals against a valve seat 604. The valve body 602 and valve seat 604 are identical to those described with reference to the intake valve 500.

A static component 606 used with the discharge valve 600 is a discharge plug 608. The plug 608 is sized to be closely received within the opening 21 of the first section 26 of the first conduit 22. An elongate stem 610 projects from a bottom surface 612 of the plug 608. A blind bore 614 is formed in the plug 608 that opens on its bottom surface 612. The stem 610 has a threaded upper portion 615 that mates with a threaded portion of the bore 614 formed in the plug 608. Because the stem 610 is threaded to the plug 608, the stem 610 may be removed and replaced with a new stem, if needed.

When the stem 610 is installed within the plug 608, a portion of the bore 614 remains open such that a chamber 616 is formed in the plug 608. The chamber 616 communicates with an axial drainage channel 618 formed in the stem 610. The channel 618 opens on a base 620 and a top end 622 of the stem 610. A set of relief bores 624 are formed in the plug 608 that communicate with the chamber 616 and the first conduit 22.

In operation, fluid that accumulates within a blind bore 626 formed in the valve body 602 may drain from the bore 626 through the channel 618 and fill the chamber 616. Fluid within the chamber 616 may drain through the relief bores 624 into the first conduit 22. To help combat erosion, the stem 610 and the bore 626 may be sprayed with or formed from a material known to reduce erosion, such as tungsten carbide.

A spring 628 is positioned between a top surface 630 of the valve body 602 and the bottom surface 612 of the plug 608. The spring 628 biases the valve body 602 in a closed position. The valve body 602 moves between an open and closed position in the same manner as the valve body 102 of the intake valve 100, which is described with reference to FIGS. 3 and 5.

Figure 14:
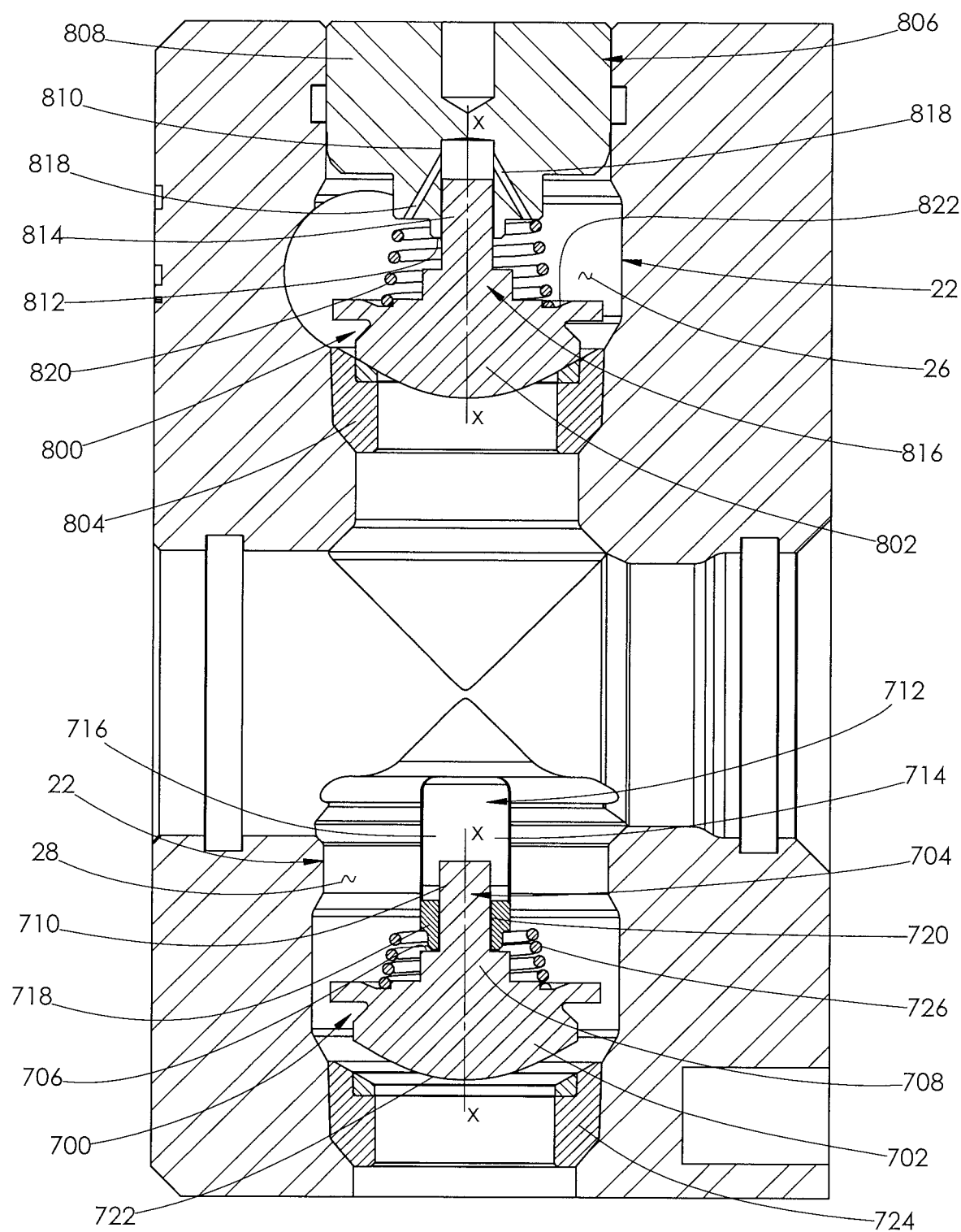
FIG. 14 is a cross-sectional view of a portion of the fluid end shown in FIG. 1, taken along line A-A. A fourth embodiment of a discharge valve is installed in an upper section of the vertical conduit. A fourth embodiment of an intake valve is installed in a lower section of the same conduit.
Figure 16:
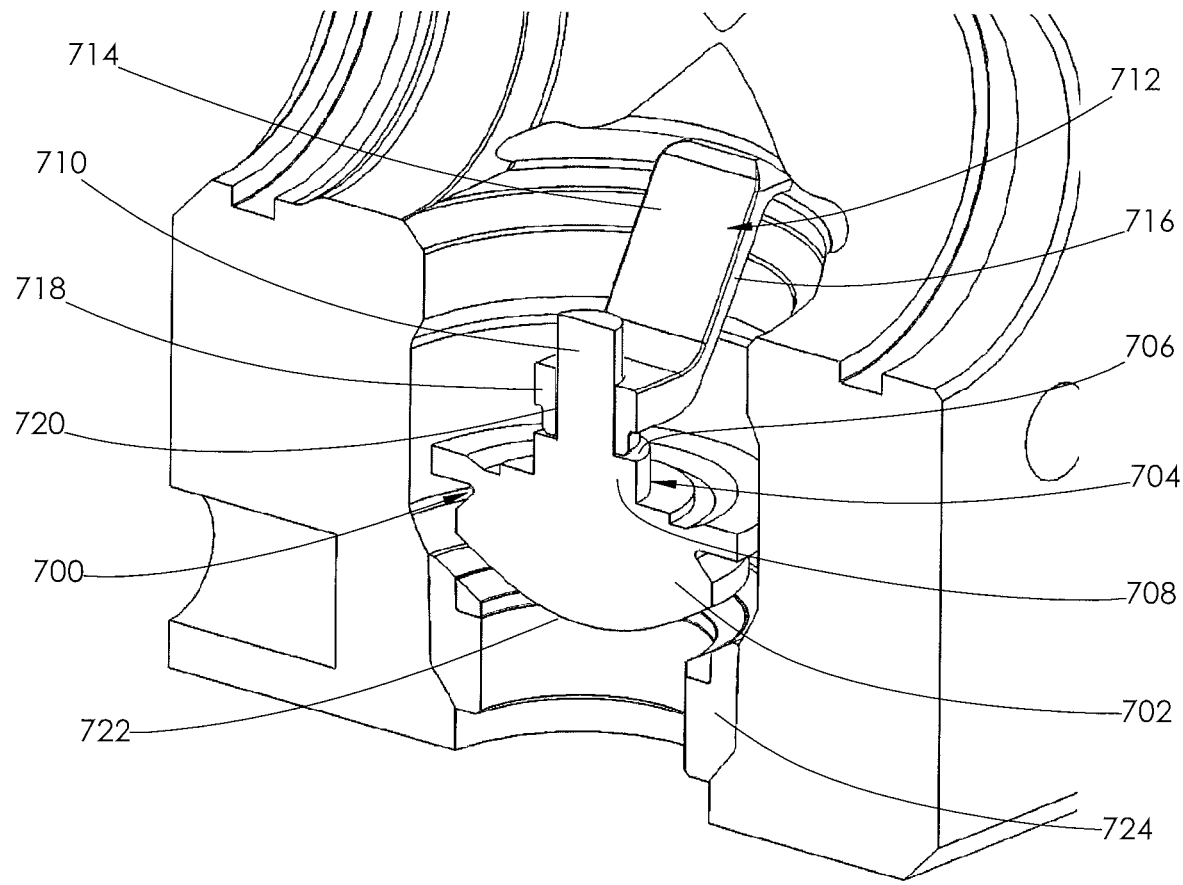
FIG. 16 is a perspective cross-sectional view of the intake valve shown in FIG. 14. A spring used with the valve has been removed for clarity.

Turning to FIGS. 14 and 16, a fourth embodiment of an intake valve 700 is positioned within the second section 28 of the first conduit 22. The intake valve 700 comprises a valve body 702 configured to move between an open and closed position. An elongate stem 704 projects from a top surface 706 of the valve body 702. The stem 704 has a wide base 708 joined to a narrow neck 710.

A static component 712 is rigidly installed within the second section 28 of the first conduit 22 above the valve body 702. The static component 712 is a retainer 714 having side arms 716 joined by a base 718, such that the retainer 714 has a U-shape. The retainer 714 is installed within the second section 28 in the same manner as the retainer 140, which is described with reference to FIGS. 3 and 5. A bore 720 is formed in the base 718 of the retainer 714 for closely receiving the stem 704.

As the valve body 702 moves between open and closed positions, the narrow neck 710 of the stem 704 axially reciprocates within the bore 720 along the X-X axis, as shown in FIG. 14. The wide base 708 of the stem 704 engages with the base 718 of the retainer 714 as the valve body 702 moves between the open and closed positions. Engagement of the wide base 708 with the retainer 714 blocks the valve body 702 from further axial movement when moving to the open position. In operation, any fluid that enters the bore 720 formed in the retainer 714 may drain from its open ends. To help combat erosion, the stem 704 and the bore 720 may be sprayed with or formed from a material known to reduce erosion, such as tungsten carbide.

Continuing with FIGS. 14 and 16, a rounded bottom surface 722 of the valve body 702 seals against a valve seat 724. The valve seat 724 is identical to the valve seat 104 used with the intake valve 100 shown in FIGS. 3 and 5. The valve body 702 moves between the open and closed positions in the same manner as the valve body 102, which is described with reference to FIGS. 3 and 5.

A spring 726 is positioned between the top surface 706 of the valve body 702 and the base 718 of the retainer 714. The spring 726 biases the valve body 702 in a closed position. The valve body 702 moves between an open and closed position in the same manner as the valve body 102 of the intake valve 100, which is described with reference to FIGS. 3 and 5.

Figure 15:
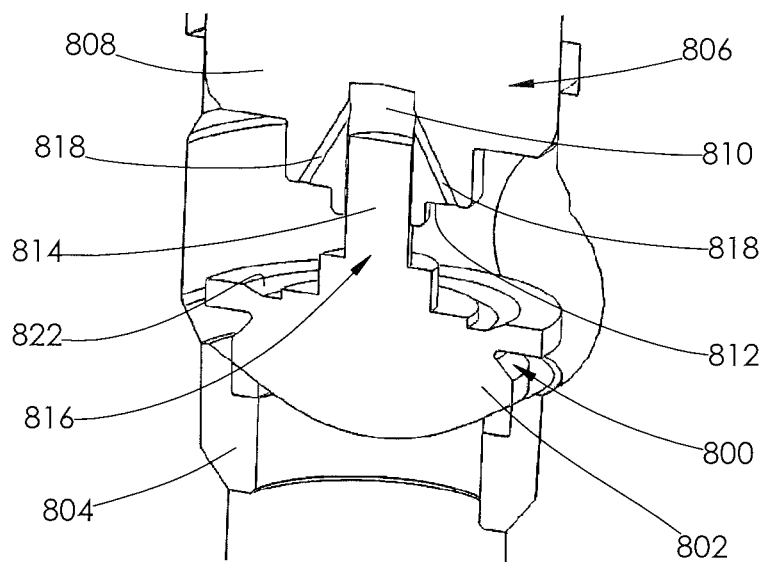
FIG. 15 is a perspective cross-sectional view of the discharge valve shown in FIG. 14. A spring used with the valve has been removed for clarity.

With reference to FIGS. 14 and 15, a fourth embodiment of a discharge valve 800 is positioned within the first section 26 of the first conduit 22. The discharge valve 800 comprises a valve body 802 that seals against a valve seat 804. The valve body 802 and valve seat 804 are identical to those used with the intake valve 100 shown in FIGS. 3 and 5. A static component 806 used with the discharge valve 800 is a discharge plug 808. A blind bore 810 is formed in the plug 808 that opens on its bottom surface 812. The bore 810 is configured to closely receive a narrow neck 814 of a stem 816.

A pair of relief bores 818 are formed in the plug 808 that communicate with the bore 810 and the first conduit 22. The relief bores 818 are formed at a non-zero angle relative to the X-X axis shown in FIG. 14. In alternative embodiments, at least a portion of the relief bores may be formed parallel to the longitudinal axis of the bore. In operation, any fluid that enters the bore 810 may drain into the first conduit 22 through the relief bores 818. To help combat erosion, the stem 816 and the bore 810 may be sprayed with or formed from a material known to reduce erosion, such as tungsten carbide.

A spring 820 is positioned between a top surface 822 of the valve body 802 and the bottom surface 812 of the plug 808. The spring 820 biases the valve body 802 in a closed position. The valve body 802 moves between an open and closed position in the same manner as the valve body 102 of the intake valve 100.

The discharge plugs 210, 608, and 808 described herein may take on different shapes and sizes depending on the configuration of the fluid end 10. For example, the plugs 210, 608, and 808 may have the same shape and construction as those described in U.S. Patent Publication No. 2019/0017503, authored by Foster, et at, and U.S. Patent Publication No. 2018/0058447, authored by Foster et al. Likewise, the fluid end housing 20 may have different shapes and sizes. The fluid end 10 shown in FIG. 1 is a flanged fluid end. In alternative embodiments, the fluid end may be flangeless and be formed of two bodies joined together, such as the fluid end described in U.S. patent application Ser. No. 16/216,685, authored by Nowell, et al.

Various modifications can be made in the design and operation of the present invention without departing from the spirit thereof. Thus, while the principle preferred construction and modes of operation of the invention have been explained in what is now considered to represent its best embodiments, which have been illustrated and described, it should be understood that the invention may be practiced otherwise than as specifically illustrated and described.

The invention claimed is:
1. A fluid end comprising:
a housing having a conduit extending therethrough;
a valve body situated within the conduit and having a
  blind bore formed therein;

a removable guide element having coaxial first and second end sections, the first end section received within the bore such that the second section is entirely outside the bore, the second section defining a hollow and open-ended structure having one or more side walls having a plurality of perforations formed therein; and a static component installed within the conduit and carrying an elongate projecting stem; in which the second section of the guide element is positioned for axial reciprocation around the stem.

2. The fluid end of claim 1 in which the static component is a valve retainer mounted within the conduit such that the retainer blocks movement of the valve body.

3. The fluid end of claim 2 in which a threaded opening is formed in the valve retainer for receiving the stem.

4. The fluid end of claim 1 in which the static component is a discharge plug that is sized to be closely received within an opening of the conduit.

5. The fluid end of claim 4 in which a threaded opening is formed in the discharge plug for receiving the stem.

6. The fluid end of claim 1 in which the perforations are circular ports.

7. The fluid end of claim 1 in which the perforations are elongate axially-extending slots.

8. The fluid end of claim 1 in which at least a portion of the stem is coated with an erosion resistant material.

9. The fluid end of claim 8 in which at least a portion of the guide element is coated with an erosion resistant material.

10. The fluid end of claim 1 in which the guide element is threaded into the bore formed in the valve body.

11. The fluid end of claim 1 in which a blind bore is formed in the first section of the guide element, the bore opening into the second section.

12. The fluid end of claim 1 in which the stem has a flat base, and which a ledge is formed in the guide element, the ledge configured to engage the flat base of the stem.

13. The fluid end of claim 1 in which the guide element has a flange formed around its outer periphery and engages a top surface of the valve body.

14. The fluid end of claim 1 in which the bore formed in the valve body is untapered.

15. The fluid end of claim 14 in which the first section of the guide element engages the base of the bore formed in the valve body.

16. The fluid end of claim 1 in which the valve body, the removable guide element, and the static component are respectively characterized as a first valve body, a first removable guide element, and a first static component, and further comprising:

a second valve body situated within the conduit and having a blind bore formed therein;

a second removable guide element having coaxial first and second end sections, the first end section received within the bore such that the second section is entirely outside the bore, the second section defining a hollow and open-ended structure having one or more side walls having a plurality of perforations formed therein; and a second static component installed within the conduit and carrying an elongate projecting stem; in which the second section of the guide element is positioned for axial reciprocation around the stem.

17. The fluid end of claim 16 in which the first static component is a valve retainer mounted within the conduit such that the retainer blocks movement of the valve body, and in which the second static component is a discharge plug that is sized to be closely received within an opening of the conduit.

18. The fluid end of claim 1, further comprising:

a seat installed in the housing and configured to engage the valve body.

19. The fluid end of claim 18 further comprising:

a spring configured to hold the valve body against the seat.

20. A system comprising:

the fluid end of claim 1; and fluid under high pressure and flowing within the housing.

* * * * *